(No Model.)

W. S. TWITTY.
LINE FASTENER.

No. 517,597. Patented Apr. 3, 1894.

Witnesses:
Charles O. Hervey
N. A. Rogers.

Inventor:
William S. Twitty
by his Attorneys

UNITED STATES PATENT OFFICE.

WILLIAM S. TWITTY, OF CHICAGO, ILLINOIS.

LINE-FASTENER.

SPECIFICATION forming part of Letters Patent No. 517,597, dated April 3, 1894.

Application filed August 31, 1893. Serial No. 484,451. (No model.)

*To all whom it may concern:*

Be it known that I, WILLIAM S. TWITTY, a citizen of the United States of America, residing at Chicago, in the county of Cook and State of Illinois, have invented certain new and useful Improvements in Line-Fasteners, of which the following is a specification.

My invention relates to improvements in line fasteners, or devices for securing the ends of clothes lines or other cords or ropes stretched from point to point for any purpose whatever.

The invention is fully described and explained in this specification and shown in the accompanying drawings in which—

Figure 1:
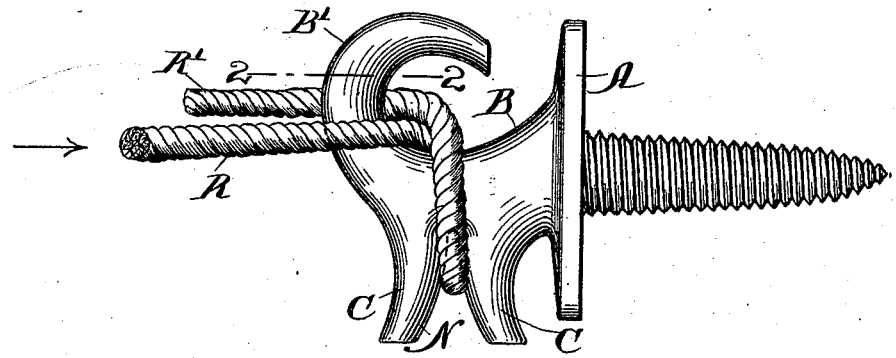
Figure 2:
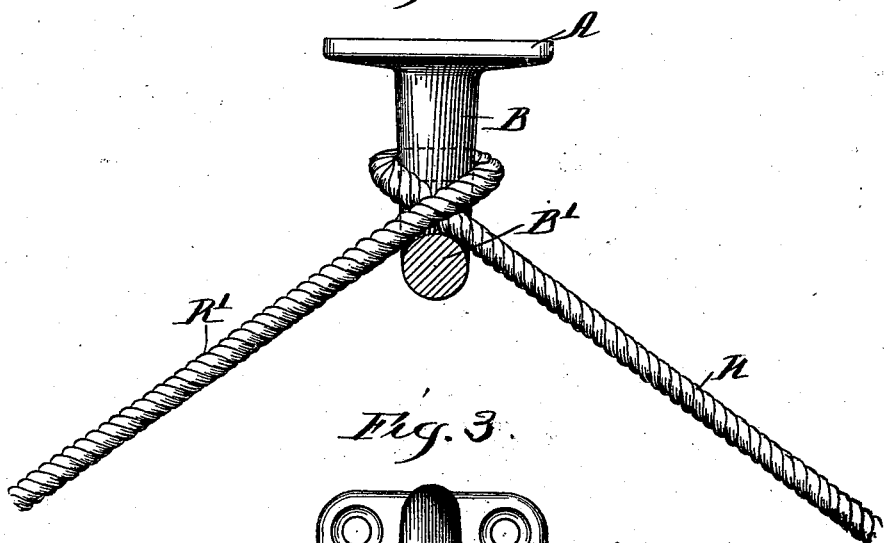
Figure 3:
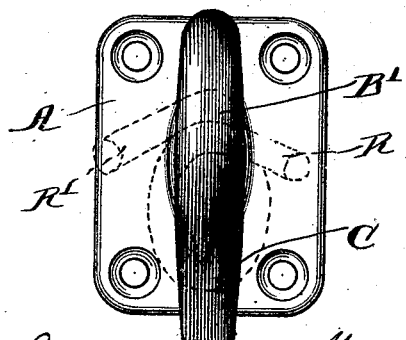

Figure 1 is a side elevation of a fastener embodying my invention and a portion of a rope in operative connection therewith. Fig. 2 is a horizontal section through the line 2—2 Fig. 1; the view being downward and the base plate of the device being slightly modified. Fig. 3 is a front elevation of the device as shown in Fig. 2 the view being in the direction indicated by the arrow in Fig. 1, the cord being in dotted lines.

In the views A, is a plate adapted to be secured at a wall or post, B, is a shank integral with the plate, and B' is a curved hook of the usual shape formed on the end of the shank.

On the lower margin of the shank B, are formed two downwardly projecting horns C, C, separated by a wedge shaped notch N, narrowest at its upper end, the narrowest portion of the notch being of such width as to fit it for use with cord of any desired size.

In use the plate A, of each fastener is screwed or nailed to a stationary support and the line to be supported is secured at one end to one of the fasteners in any desired manner and then passed about each of the other fasteners in the manner shown in Figs. 1 and 2, the portion R, of the line being passed over the shank and thence through the notch between the horns C, C, and then carried over the shank and the portion R, and extended in the direction of the next fastener, the overlying portion of the line being designated by the letter R'. The strain upon the line wedges it firmly in the notch N, and prevents it from slipping in either direction, and I have found in practice that if either of the parts R, R', be broken or cut away from the fastener, the portion of the cord lying in the notch will be held securely and the remainder of the line will thus be supported though the broken part falls to the ground. At the same time however, that the line is thus held securely against accidental detachment, it may be very readily removed or loosened from the fastener for the purpose of drawing it taut, so that it is a very convenient as well as a very effective supporting device.

It is evident that the form of the hook B', is immaterial and also that the plate A, may be replaced by any other suitable element for fastening the device to a stationary support. The plate itself may either be formed with an integral screw as shown in Fig. 1, or with screw-holes as shown in Fig. 3, either means of fastening it to a support being well known.

Having now described and explained my invention, what I claim as new, and desire to secure by Letters Patent, is—

In a line fastener a shank provided with means for securing it to a stationary support, formed with a hook projecting in one direction and two diverging horns projecting in the opposite direction and separated by a wedge shaped notch widest at its open end, the shank being adapted to receive a loop of the line passing through the hook and notch; substantially as shown and described.

WILLIAM S. TWITTY.

Witnesses:
CHARLES O. SHERVEY,
N. A. ROGERS.